(12) United States Patent
Ruehmann et al.

(10) Patent No.: US 10,760,987 B2
(45) Date of Patent: Sep. 1, 2020

(54) AUTOMATED LOAD CELL IDENTIFICATION

(71) Applicant: Weatherford Technology Holdings, LLC, Houston, TX (US)

(72) Inventors: Rainer Ruehmann, Hannover (DE); Enrico Schleske, Hannover (DE)

(73) Assignee: Weatherford Technology Holdings, LLC, Houston, TX (US)

( * ) Notice: Subject to any disclaimer, the term of this patent is extended or adjusted under 35 U.S.C. 154(b) by 0 days.

(21) Appl. No.: 16/552,489

(22) Filed: Aug. 27, 2019

(65) Prior Publication Data

US 2019/0383682 A1  Dec. 19, 2019

Related U.S. Application Data

(63) Continuation of application No. 15/337,148, filed on Oct. 28, 2016, now Pat. No. 10,436,658.

(51) Int. Cl.
  *G01L 5/24* (2006.01)
  *E21B 47/007* (2012.01)
  *E21B 19/16* (2006.01)

(52) U.S. Cl.
  CPC .............. *G01L 5/24* (2013.01); *E21B 19/165* (2013.01); *E21B 19/166* (2013.01); *E21B 47/007* (2020.05)

(58) Field of Classification Search
  CPC .. E21B 47/0006; E21B 19/165; E21B 19/166; G01L 5/24
  See application file for complete search history.

(56) References Cited

U.S. PATENT DOCUMENTS

| | | | |
|---|---|---|---|
| 4,592,125 | A | 6/1986 | Skene |
| 4,738,145 | A | 4/1988 | Vincent et al. |
| 5,245,265 | A | 9/1993 | Clay |
| 8,280,639 | B2 | 10/2012 | Conquergood et al. |
| 8,726,743 | B2 | 5/2014 | Ruehmann et al. |
| 2004/0144547 | A1 | 7/2004 | Koithan et al. |

(Continued)

FOREIGN PATENT DOCUMENTS

WO   2009039448   3/2009

OTHER PUBLICATIONS

International Search Report dated Feb. 7, 2018, corresponding to Application No. PCT/US2017/057994. 14 Pages.

(Continued)

*Primary Examiner* — Michael R Wills, III
(74) *Attorney, Agent, or Firm* — Patterson + Sheridan, LLP

(57) ABSTRACT

Aspects of the present disclosure relate to automated load cell identification. One example method generally includes sending, from a load cell to a remote processing system, identification information associated with the load cell; and determining whether the load cell is valid for use during makeup of a threaded connection of a first threaded tubular to a second threaded tubular based on the identification information associated with the load cell. The load cell identification information may include a measurement range of torque values supported. The method can include comparing the measurement range of torque values to a job-defined range of torque values associated with the makeup of the threaded connection; and determining that the load cell is valid for use based on the comparison. The identification information can be used to detect the load cell type, range, and calibration data before tubular makeup to ensure data quality and safety at work.

19 Claims, 7 Drawing Sheets

(56) References Cited

U.S. PATENT DOCUMENTS

| | | |
|---|---|---|
| 2005/0096846 A1 | 5/2005 | Koithan et al. |
| 2007/0107912 A1 | 5/2007 | Boutwell et al. |
| 2010/0132180 A1 | 6/2010 | Conquergood et al. |
| 2016/0076356 A1 | 3/2016 | Krems et al. |
| 2017/0016287 A1 | 1/2017 | Dion |
| 2017/0096864 A1 | 4/2017 | Blair et al. |

OTHER PUBLICATIONS

International Search Report in related applicaiton PCT/US2017/062315 dated Nov. 16, 2018. 20 Pages.

EPO Office Action dated Apr. 28, 2020, for European Application No. 17794586.2.

AUTOMATED LOAD CELL IDENTIFICATION

CROSS-REFERENCE TO RELATED APPLICATIONS

This application is a continuation of U.S. patent application Ser. No. 15/337,148, filed Oct. 28, 2016 and entitled "AUTOMATED LOAD CELL IDENTIFICATION," which is herein incorporated by reference.

BACKGROUND OF THE DISCLOSURE

Field of the Disclosure

The present disclosure generally relates to makeup tools and, more specifically, to automated load cell identification to detect the load cell type, range, and calibration data before tubular makeup to ensure the data quality.

Description of the Related Art

In wellbore construction and completion operations, a wellbore is formed to access hydrocarbon-bearing formations (e.g., crude oil and/or natural gas) by the use of drilling. Drilling is accomplished by utilizing a drill bit that is mounted on the end of a drill string. To drill within the wellbore to a predetermined depth, the drill string is often rotated by a top drive or rotary table on a surface platform or rig, or by a downhole motor mounted towards the lower end of the drill string. After drilling to a predetermined depth, the drill string and drill bit are removed and a string of casing is lowered into the wellbore. An annulus is thus formed between the casing string and the formation. The casing string is temporarily hung from the surface of the well. A cementing operation is then conducted in order to fill the annulus with cement. The casing string is cemented into the wellbore by circulating cement into the annulus defined between the outer wall of the casing and the borehole. The combination of cement and casing strengthens the wellbore and facilitates the isolation of certain areas of the formation behind the casing for the production of hydrocarbons.

A drilling rig is constructed on the earth's surface or floated on water to facilitate the insertion and removal of tubular strings (e.g., drill pipe, casing, sucker rod, riser, or production tubing) into a wellbore. The drilling rig includes a platform and power tools, such as an elevator and slips, to engage, assemble, and lower the tubulars into the wellbore. The elevator is suspended above the platform by a draw works that can raise or lower the elevator in relation to the floor of the rig. The slips are mounted in the platform floor. The elevator and slips are each capable of engaging and releasing a tubular and are designed to work in tandem. Generally, the slips hold a tubular or tubular string that extends into the wellbore from the platform. The elevator engages a tubular joint and aligns it over the tubular string being held by the slips. One or more power drives, e.g. a power tong and a spinner, are then used to thread the joint and the string together. Once the tubulars are joined, the slips disengage the tubular string and the elevator lowers the tubular string through the slips until the elevator and slips are at a predetermined distance from each other. The slips then reengage the tubular string and the elevator disengages the string and repeats the process. This sequence applies to assembling tubulars for the purpose of drilling, deploying casing, or deploying other components into the wellbore. The sequence is reversed to disassemble the tubular string.

During operations, the threaded connections can be monitored to ensure that the connections are good. Load cells can be used to measure information force data. The information can be provided to a control system. The control system can process the information and can provide an output, for example, to a display. An operator can view the display and make decisions regarding the threaded connections. In some cases, the control system can also take input from the operator.

In order to reduce the possibility of human error and to increase efficiency, it is desirable to automate the process of load cell identification and information related to the load cell, in order to verify the load cell and ensure data quality during make up.

SUMMARY OF THE DISCLOSURE

The present disclosure generally relates to automated load cell identification, which may include information such as the load cell type, the load cell range, unique serial number and calibration data of the load cell. The load cell identification information may be sent to a remote processor before a tubular makeup to ensure the data quality.

In one aspect, a method of automated load cell identification is provided. The method generally includes sending, from a load cell to a remote processing system, identification information associated with the load cell and determining whether the load cell is valid for use during makeup of a threaded connection of a first threaded tubular to a second threaded tubular based on the identification information associated with the load cell.

In another aspect, a tubular makeup system is provided. The tubular makeup system generally includes a load cell and a remote processing system in communication with the load cell, wherein: the load cell is configured to sending identification information associated with the load cell to the remote processing system; and the remote processing system is configured to determine whether the load cell is valid for use during makeup of a threaded connection of a first threaded tubular to a second threaded tubular based on the identification information associated with the load cell.

Aspects generally include methods, apparatus, systems, computer readable mediums, and processing systems, as substantially described herein with reference to and as illustrated by the accompanying drawings.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Aspects of the present disclosure generally relate to automated load cell identification. For example, tubular makeup can include use of power tongs. However, the aspects of this disclosure for automated load cell identification are not limited to this system, but could be used for automated load cell identification in any system using load cells. The power tongs (or other system) may include load cells to measure force applied to connections during the tubular makeup (or other connections, such as casing, etc., duration a makeup process). The load cells may be in communication with a remote processing system, which may be on-site, in a nearby operator room, or off-site.

The remote processing system may be used to analyze the measurements, such as force measurements by the load cell during a tubular makeup. The remote processing system may perform such functions as providing outputting information to a display, such as graphical representations of calculated torque, alerts or status message to an operator related to quality of the connections in the system, or even automated control of the system based on the measurements. In some cases, the remote processing system uses other processing systems, clients, or programs to perform some of the functions described above. In some cases, the remote processing system is operated by, or takes some input, from an operator or technician. FIGS. 1-3 below illustrate one example of a tubular makeup system in communication with a processing system with a graphical evaluator, in which aspects of the present disclosure may be applied.

Techniques and apparatus are provided herein for automated load cell identification, which may reduce the need for manual input from the operator/technician in these types of systems, which in turn may reduce errors in torque calculations and lead to improved and more efficient evaluations of connections.

Example Graphical Evaluator for Tubular Makeup

Figure 1A:
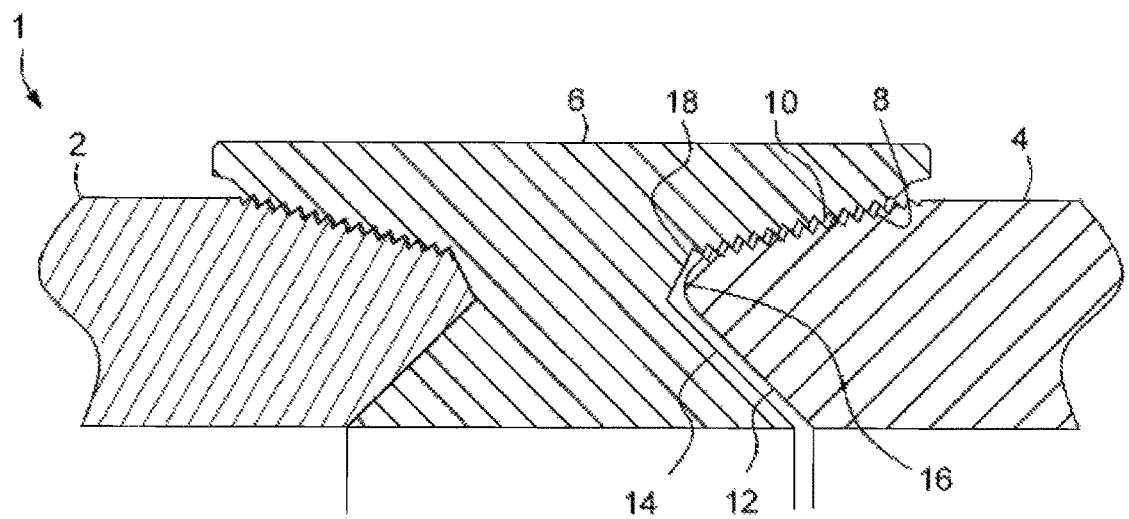
FIG. 1A is a partial cross section view of a connection between threaded premium grade tubulars.

FIG. 1A illustrates a connection 1 between premium grade tubulars 2, 4. The tubulars 2, 4 may be any oil country tubular good, such as production tubing, casing, liner, or drill pipe. The connection 1 may include a first tubular 2 joined to a second tubular 4 through a tubular coupling 6. Each of the tubulars 2, 4 and the coupling 6 may be made from a metal or alloy, such as plain carbon steel, low alloy steel, high strength low alloy steel, stainless steel, or a nickel based alloy. The end of each tubular 2, 4 may have a tapered externally-threaded surface 8 (aka a pin) which co-operates with a correspondingly tapered internally-threaded surface (aka box) 10 on the coupling 6. Each tubular 2, 4 may be provided with a torque shoulder 12 which co-operates with a corresponding torque shoulder 14 on the coupling 6. At a terminal end of each tubular 2, 4, there may be defined an annular sealing area 16 which is engageable with a co-operating annular sealing area 18 defined between the tapered portions 10, 14 of the coupling 6. Alternatively, the sealing areas 16, 18 may be located at other positions in the connection 1 than adjacent the shoulders 12, 14.

Figure 1B:
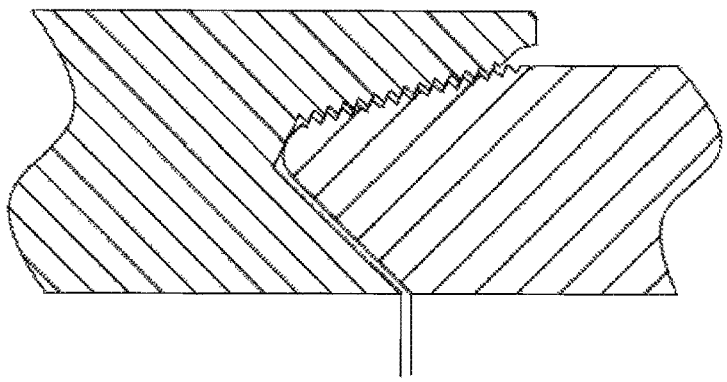
FIG. 1B is a partial cross section view of a connection between threaded premium grade tubulars in a seal position formed by engagement between sealing surfaces.
Figure 1C:
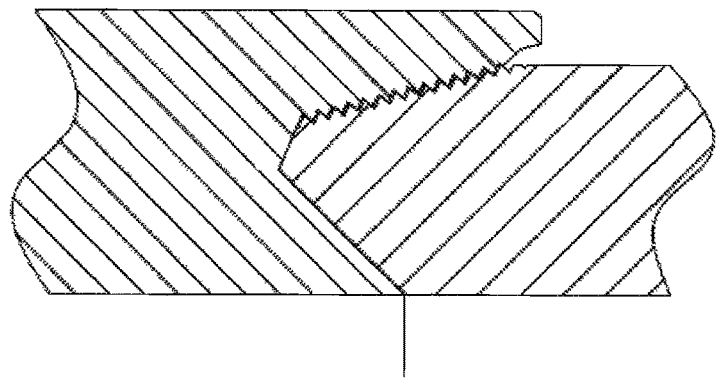
FIG. 1C is a partial cross section view of a connection between threaded premium grade tubulars in a shoulder position formed by engagement between shoulder surfaces.

During makeup, the box 10 is engaged with the pin 8 and then screwed onto the pin by relative rotation therewith. During continued rotation, the annular sealing areas 16, 18 contact one another, as shown in FIG. 1B. This initial contact is referred to as the "seal position". As the coupling 6 is further rotated, the co-operating tapered torque shoulders 12, 14 contact and bear against one another at a machine detectable stage referred to as a "shoulder position", as shown in FIG. 1C. The increasing pressure interface between the tapered torque shoulders 12, 14 cause the seals 16, 18 to be forced into a tighter metal-to-metal sealing engagement with each other causing deformation of the seals 16 and eventually forming a fluid-tight seal.

Figure 2A:
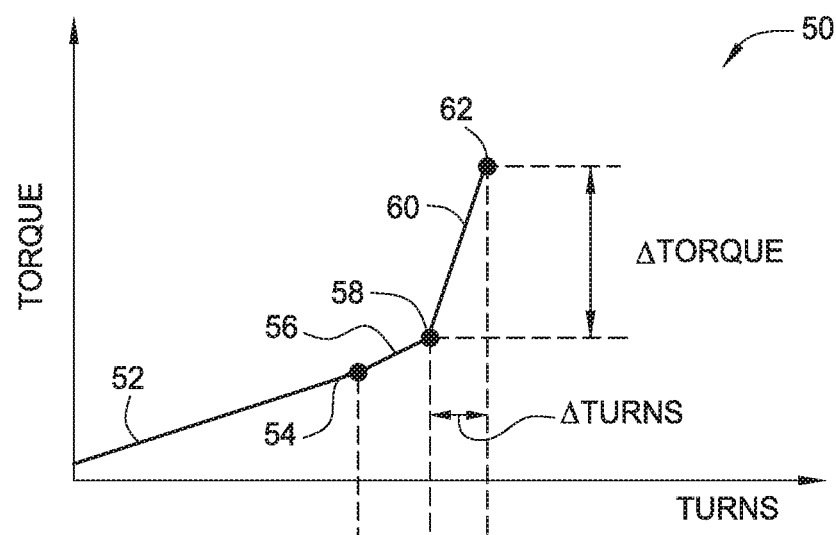
FIG. 2A illustrates an ideal torque-turns curve for the premium connection.
Figure 2B:
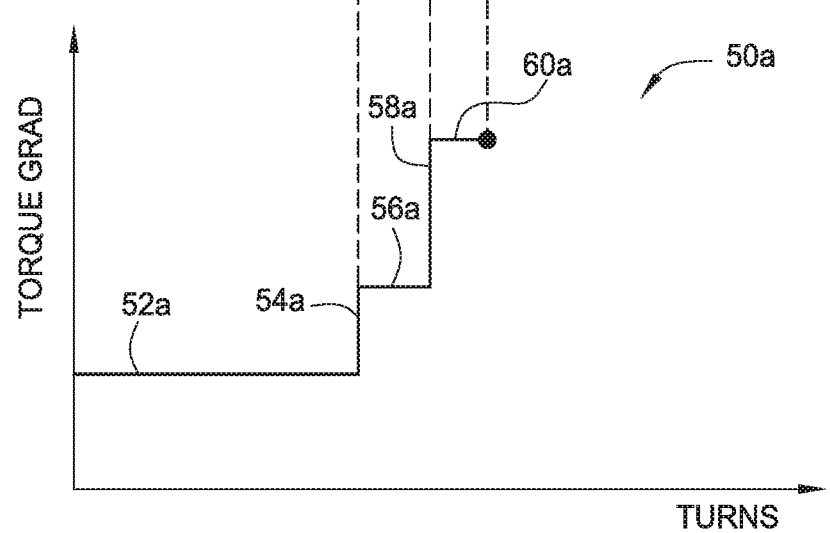
FIG. 2B illustrates an ideal torque gradient-turns curve for the premium connection.

FIG. 2A illustrates an ideal torque-turns curve 50 for the premium connection. FIG. 2B illustrates an ideal torque gradient-turns curve 50a for the premium connection. During makeup of the tubulars 2, 4, torque and turns measurements may be recorded and the curves 50, 50a displayed for evaluation by a technician. Shortly after the coupling 6 engages the tubular 4 and torque is applied, the measured torque increases linearly as illustrated by curve portion 52. As a result, corresponding curve portion 52a of the differential curve 50a is flat at some positive value.

During continued rotation, the annular sealing areas 16, 18 contact one another causing a slight change (specifically, an increase) in the torque rate, as illustrated by point 54. Thus, point 54 corresponds to the seal position shown in FIGS. 1B and 1s plotted as the first step 54a of the differential curve 50a. The torque rate then again stabilizes resulting in the linear curve portion 56 and the plateau 56a. In practice, the seal condition (point 54) may be too slight to be detectable. However, in a properly behaved makeup, a discernable/detectable change in the torque rate occurs when the shoulder position is achieved (corresponding to FIG. 1C), as represented by point 58 and step 58a. The torque rate then again increases linearly as illustrated by curve portion 60 and the plateau 60a until makeup of the connection is terminated at final torque 62.

Figure 3A:
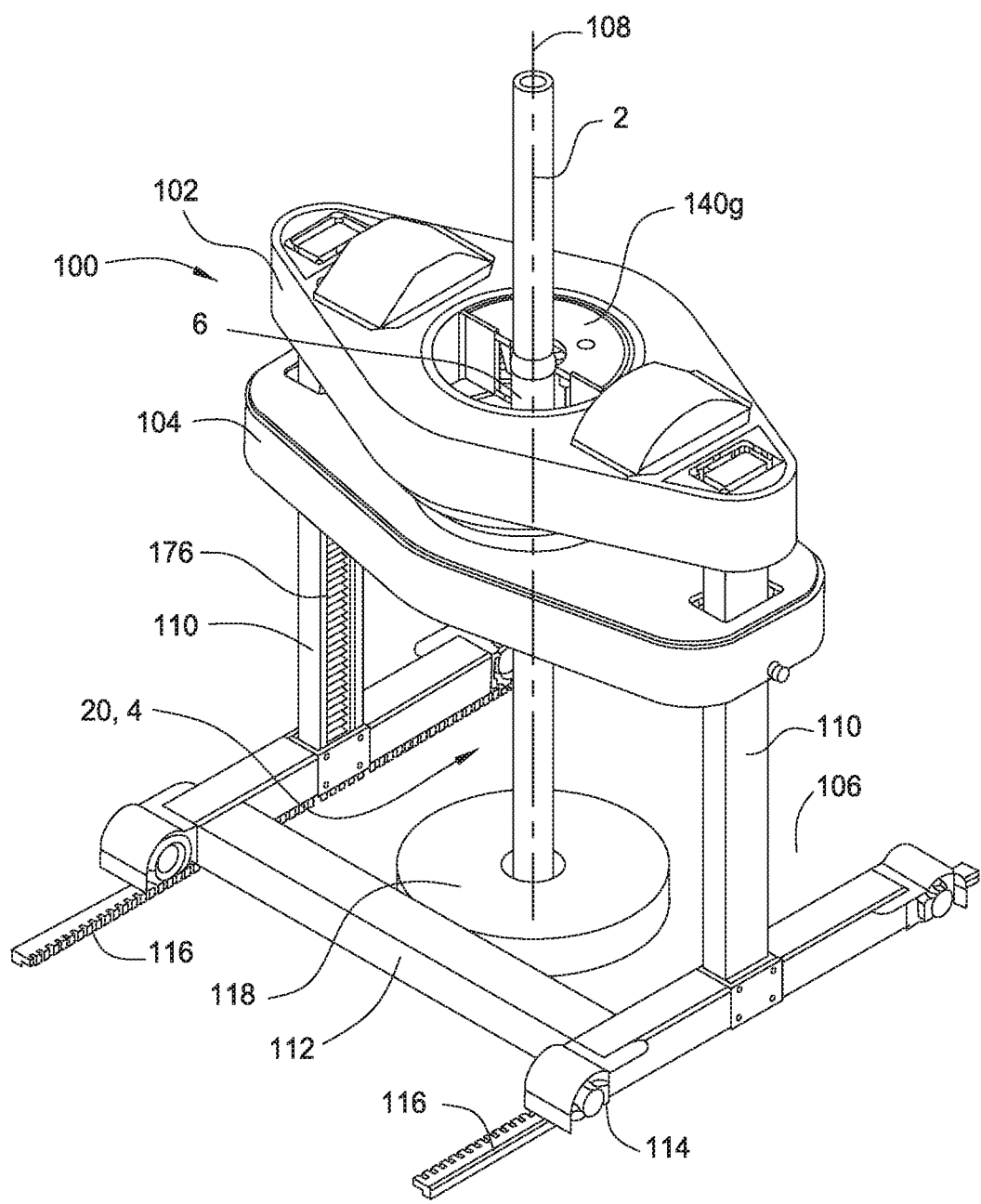
FIG. 3A is a perspective view of a tong assembly in an upper position.

FIG. 3A is a perspective view of a power drive, such as tong assembly 100, in an upper position. A group 140g of clamps has been removed for illustrative purposes. The tong assembly 100 may include a power tong 102 and a back-up tong 104 located on a drilling rig 106 coaxially with a drilling center 108 of the drilling rig 106. The assembly 100 may be coupled in a vertically displaceable manner to one or more guide columns 110 (two shown) arranged diametrically opposite each other relative to the drilling centre 108. The guide columns 110 may be connected to a chassis 112 which by wheels 114 and hydraulic motors (not shown) may be displaced horizontally on rails 116 connected to the drilling rig 106. In the operative position, the assembly 100 may be located immediately above the slips 118 of the drilling rig 106.

The power tong 102 may include a power tong housing provided with a through aperture that corresponds to the guide columns 110, and an undivided drive ring connected via a bearing ring (not shown). The bearing ring may have a toothed ring (not shown) in mesh with cogwheels (not shown) on one or more hydraulic motors (not shown), such as two. One of the motors may be a spinner motor (high speed, low torque) and the other motor may be one or more torque motors (high torque, low speed). The toothed ring may be coupled to the drive ring by screw-bolt-joints (not shown). The hydraulic motors may be arranged to rotate the drive ring about the drilling centre 108. The two hydraulic motors may be disposed on diametrically opposite sides of the drive ring. A cover may be provided to cover the power tong housing.

In the drive ring and co-rotating with this may be two crescent-shaped groups 140*g* (only one shown) of clamps. Each group 140*g* of clamps may be provided with one or more, such as three, clamps distributed around the drilling center 108. Each clamp may include a cylinder block provided with one or more, such as three, cylinder bores arranged in a vertical row. In each cylinder bore may be a corresponding longitudinally displaceable piston that seals against the cylinder bore by a piston gasket. A rear gasket may prevent pressurized fluid from flowing out between the piston and the cylinder bore at the rear end of the piston.

The pistons may be fastened to the housing of the group 140*g* of clamps by respective screw-bolt-joints. On the part of the cylinder block facing the drilling center 108 there may be provided a gripper. The gripper may be connected to the cylinder block by fastening, such as with dovetail grooves or screw-bolt-joints (not shown). Surrounding the drive ring there may be provided a swivel ring that seals by swivel gaskets, the swivel ring may be stationary relative to the power tong housing. The swivel ring may have a first passage that communicates with the plus side of the pistons via a first fluid connection, a second passage that communicates with the minus side of the pistons via a second fluid connection, and a further passage. The cylinder and the piston may thereby be double acting. The swivel ring, swivel gaskets and drive ring may together form a swivel coupling.

The backup tong 104 may also include the clamp groups. The back-up tong 104 may further include a back-up tong housing with guides 176 that correspond with the guide columns 110, and a retainer ring for two groups of clamps. At the guides 176 there may be cogwheels that mesh with respective pitch racks of the guide columns 110. Separate hydraulic motors may drive the cogwheels via gears. A pair of hydraulic cylinders may be arranged to adjust the vertical distance between the power tong 102 and the back-up tong 104.

In operation, when the tubular joint 2 is to be added to tubular string 20 (already including tubular joint 4), the assembly 100 may be displaced vertically along the guide columns 110 by the hydraulic motors, the gears, the cogwheels and the pitch racks until the back-up tong 104 corresponds with the pin 8 of the tubular string 20. The box 10 of the coupling 6 may have been madeup to the pin 8 of the joint 2 offsite (aka bucking operation) before the tubulars 2, 4 are transported to the rig. Alternatively the coupling 6 may be bucked on the joint 4 instead of the joint 2. Alternatively, the coupling 6 may be welded to one of the tubulars 2, 4 instead of being bucked on.

The vertical distance between the back-up tong 104 and the power tong 102 may be adjusted so as to make the grippers correspond with the coupling 6. The clamps may be moved up to the coupling 6 by pressurized fluid flowing to the first passage in the swivel ring and on through the first fluid connection to the plus side of the pistons. The excess fluid on the minus side of the pistons may flow via the second fluid connection and the second passage back to a hydraulic power unit (not shown).

The grippers may then grip their respective pin or box while the hydraulic motors rotate the drive ring and the groups 140*g* of clamps about the drilling center 108, while at the same time constant pressure may be applied through the swivel ring to the plus side of the pistons. The power tong 102 may be displaced down towards the back-up tong 104 while the screwing takes place. After the desired torque has been achieved, the rotation of the drive ring may be stopped. The clamps may be retracted from the tubular string 20 by pressurized fluid being delivered to the minus side of the pistons via the swivel ring. The assembly 100 may be released from the tubular string 20 and moved to its lower position.

When a joint 2 is to be removed from the tubular string 20, the operation is performed in a similar manner to that described above. When tools or other objects of a larger outer diameter than the tubular string 20 are to be displaced through the assembly 100, the grippers may easily be removed from their respective clamps, or alternatively the groups 140*g* of clamps can be lifted out of the drive ring.

Alternatively, other types of tong assemblies may be used instead of the tong assembly 100.

Figure 3B:
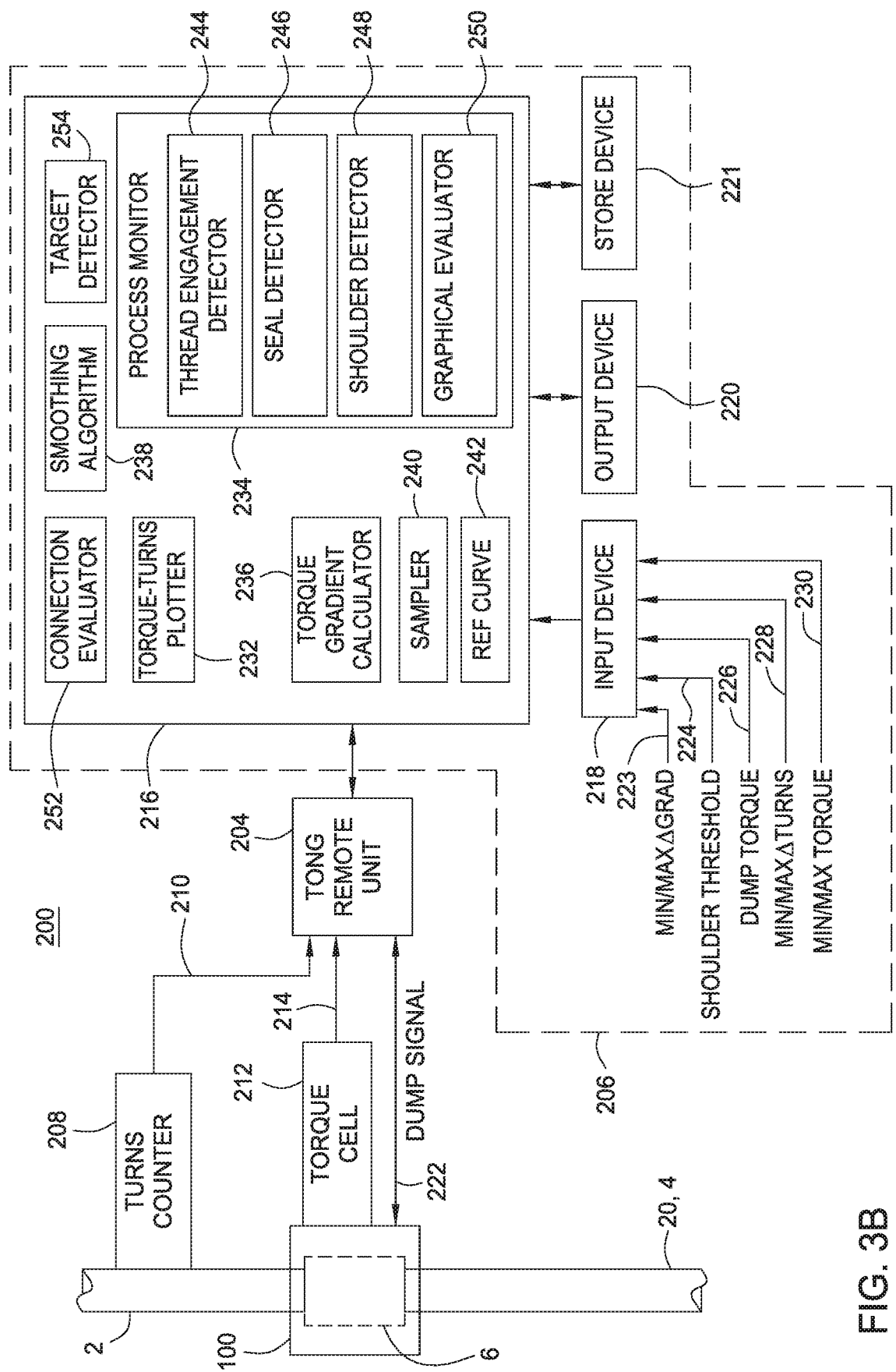
FIG. 3B is a block diagram illustrating a tubular makeup system.

FIG. 3B is a block diagram illustrating a tubular makeup system 200, according to one embodiment of the present disclosure. The tubular makeup system 200 may include the tong assembly 100, a tong remote unit (TRU) 204, a turns counter 208, a torque cell 212, and the control system 206. The control system 206 may communicate with the TRU 204 via an interface. Depending on sophistication of the TRU 204, the interface may be analog or digital. Alternatively, the control system 206 may also serve as the TRU.

A programmable logic controller (PLC) 216 of the control system 206 may monitor the turns count signals 210 and torque signals 214 from the respective sensors 208, 212 and compare the measured values of these signals with predetermined values 223-230. In aspects, the PLC 216 may be any type of embedded computer device, for example, the PLC 216 may be replaced by a microcontroller unit (MCU), field programmable gate array (FPGA), application specific integrated circuit (ASIC), application specific instruction set processor (ASIP), digital signal processor (DSP), etc. The predetermined values 223-230 may be input by a technician for a particular connection. The predetermined values 223-230 may be input to the PLC 216 via an input device 218, such as a keypad or any touch sensitive display.

Illustrative predetermined values 223-230 which may be input, by a technician or otherwise, include minimum and maximum delta gradient values 223, a shoulder threshold gradient 224, a dump torque value 226, minimum and maximum delta turns values 228, minimum and maximum torque values 230, and reference curve data 242. The minimum and maximum torque values 230 may include a set for the shoulder position and a set for the final position. The torque values 230 may be derived theoretically, such as by finite element analysis, or empirically, such as by laboratory testing and/or analysis of historical data for a particular connection. The dump torque value 226 may simply be an average of the final minimum and maximum torque values 230. During makeup of the connection 1, various output may be observed by a technician on output device, such as a video monitor, which may be one of a plurality of output devices 220. A technician may observe the various predefined values which have been input for a particular connection. Further, the technician may observe graphical information such as the torque rate curve 50 and the torque rate differential curve 50a. The plurality of output devices 220 may also include a printer such as a strip chart recorder or a digital printer, or a plotter, such as an x-y plotter, to provide a hard copy output. The plurality of output devices 220 may further include an alarm, such as a horn or other audio equipment, to alert the technician of significant events occurring during makeup, such as the shoulder position, termination, and/or a violation of a criterion.

Upon the occurrence of a predefined event(s), the PLC 216 may output a dump signal 222 to the TRU 204 to automatically shut down or reduce the torque exerted by the tong assembly 100. For example, dump signal 222 may be issued in response to the measured torque value reaching the dump torque 226 and/or a bad connection.

The comparison of measured turn count values and torque values with respect to predetermined values is performed by one or more functional units of the PLC 216. The functional units may generally be implemented as hardware, software or a combination thereof. The functional units may include one or more of a torque-turns plotter algorithm 232, a process monitor 234, a torque gradient calculator 236, a smoothing algorithm 238, a sampler 240, a database 242 of reference curves, a connection evaluator 252, and a target detector 254. The process monitor 234 may include one or more of a thread engagement detection algorithm 244, a seal detection algorithm 246, a shoulder detection algorithm 248, and a graphical evaluator algorithm 250. Alternatively, the functional units may be performed by a single unit. As such, the functional units may be considered logical representations, rather than well-defined and individually distinguishable components of software or hardware.

In operation, one of the threaded members (e.g., tubular 2 and coupling 6) is rotated by the power tong 102 while the other tubular 4 is held by the backup tong 104. The applied torque and rotation are measured at regular intervals throughout the makeup. The frequency with which torque and rotation are measured may be specified by the sampler 240. The sampler 240 may be configurable, so that a technician may input a desired sampling frequency. The torque and rotation values may be stored as a paired set in a buffer area of memory. Further, the rate of change of torque with respect to rotation (hereinafter "torque gradient") may be calculated for each paired set of measurements by the torque gradient calculator 236. The smoothing algorithm 238 may operate to smooth the torque-turns curve 50 and/or torque gradient curve 50a (e.g., by way of a running average). These values (torque, rotation, and torque gradient) may then be plotted by the plotter 232 for display on the output device 220.

The values (torque, rotation, and torque gradient) may then be compared by the connection evaluator 252, either continuously or at selected events, with predetermined values, such as the values 223-230. Based on the comparison of the measured and/or calculated values with the predefined values 223-230, the process monitor 234 may determine the occurrence of various events and the connection evaluator 252 may determine whether to continue rotation or abort the makeup. The thread engagement detection algorithm 244 may monitor for thread engagement of the pin 8 and box 10. Upon detection of thread engagement a first marker is stored. The marker may be quantified, for example, by time, rotation, torque, the torque gradient, or a combination of any such quantifications. During continued rotation, the seal detection algorithm 246 monitors for the seal condition. This may be accomplished by comparing the calculated torque gradient with a predetermined threshold seal condition value. A second marker indicating the seal condition may be stored if/when the seal condition is detected. At this point, the torque value at the seal condition may be evaluated by the connection evaluator 252.

For example, a determination may be made as to whether the turns value and/or torque value are within specified limits. The specified limits may be predetermined, or based off of a value measured during makeup. If the connection evaluator 252 determines a bad connection, rotation may be terminated. Otherwise, rotation continues and the shoulder detection algorithm 248 monitors for the shoulder position. This may be accomplished by comparing the calculated torque gradient with the shoulder threshold gradient 224. When the shoulder position is detected, a third marker indicating the shoulder position is stored. The connection evaluator 252 may then determine whether the torque value at the shoulder position is acceptable by comparing to the respective input torque values 230.

Upon continuing rotation, the target detector 254 compares the measured torque to the dump torque value 226. Once the dump torque value 226 is reached, rotation may be terminated by sending the dump signal 222. Alternatively, the dump signal 222 may be issued slightly before the dump torque 226 is reached to account for system inertia. Once the connection is complete, the connection evaluator 252 may calculate a delta turns value based on the difference between the final turns value and the turns value at the shoulder condition. The connection evaluator 252 may compare the delta turns value with the input delta turns values 228. Similarly, the connection evaluator may compare the final torque value to the respective input torque values 230. The connection evaluator 252 may calculate a delta torque value based on the difference between the final torque value and the torque value at the shoulder condition. The connection evaluator 252 may calculate a delta gradient value using delta torque and delta turns values and compare it with the respective input values 223. If either criteria is not met, then the connection evaluator 252 may indicate a bad connection.

Alternatively, a delta turns value may be entered instead of the dump torque 226. The target detector 254 may then calculate a target turns value using the shoulder turns and the delta turns value (target turns equals shoulder turns plus delta turns).

Although a tong system is described with respect to FIGS. 1-3, other systems can be used for tubular makeups, such as a top drive system. These systems can also include graphical evaluators for monitoring the connections.

As mentioned above, the example tubular makeup system 200 includes predetermined values 223-230 input by a technician or operator. Wrong inputs of the measured values may lead to incorrect calculated torque values which, in turn, may lead to under torque or over torque, and may be without any warning. In order to reduce the possibility of human error and to increase efficiency, it is desirable to automate the process of monitoring threaded connections, evaluating the quality of threaded connections, and controlling the assembly system.

In some cases, a drop down menu has been added to the operator input interface (e.g., input device 218). The drop down menu provides a finite selectable list of load cell identification information, which can help to reduce the likelihood of wrong inputs—but does not eliminate the possibility.

Aspects of the present disclosure provide techniques and apparatus for automated (i.e., hands-free) load cell identification which may reduce the amount of information that is input manually and thereby, reduce the possibility for wrong inputs in the torque calculation.

Example Automated Load Cell Identification

Figure 4:
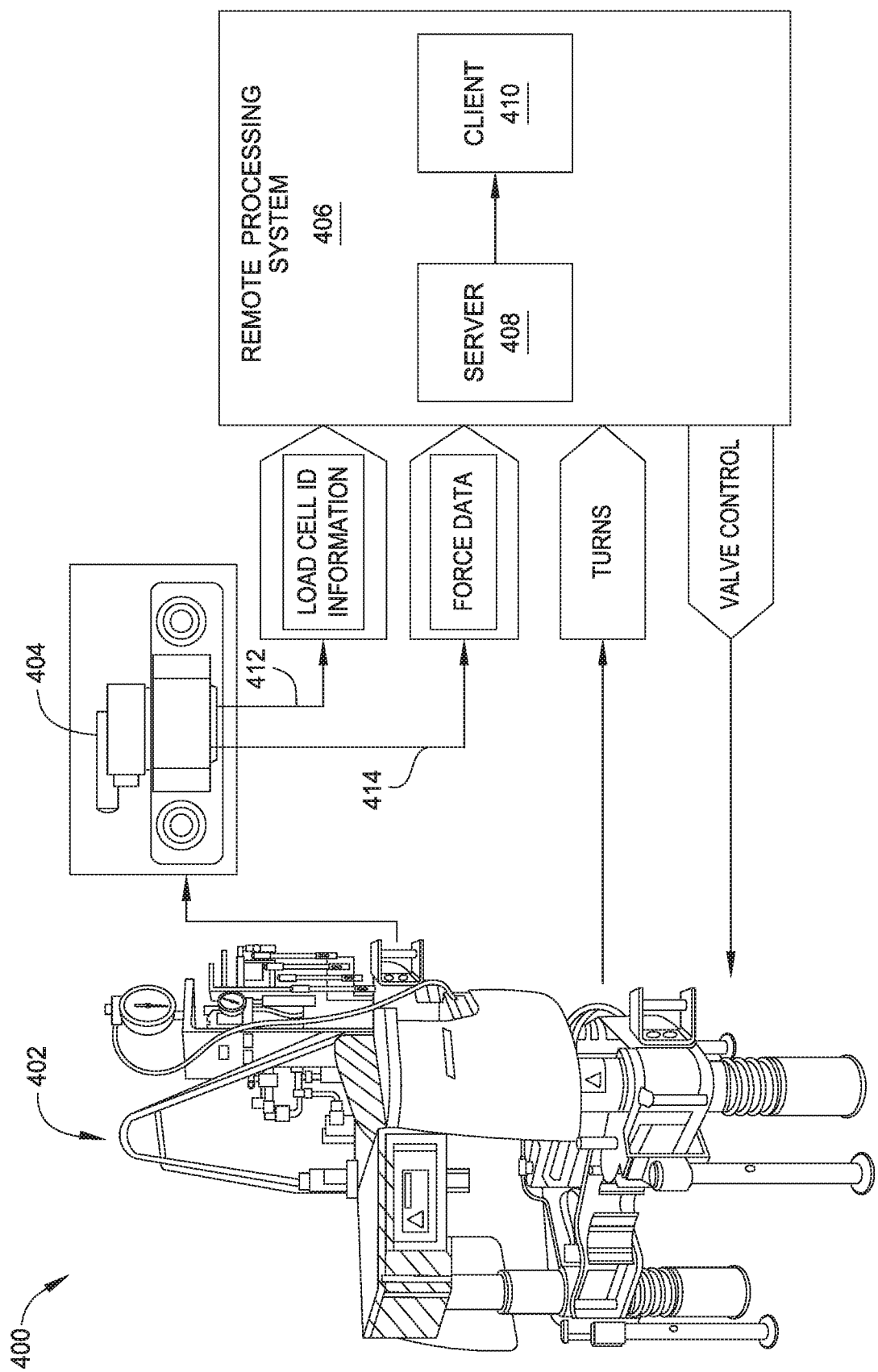
FIG. 4 illustrates an example tubular makeup system including a load cell that sends identification information, in accordance with certain aspects of the present disclosure.

FIG. 4 illustrates an example tubular makeup system 400 including a load cell that sends load cell identification information, in accordance with certain aspects of the present disclosure. In aspects, the load cell may send its identification, type, torque range, and/or calibration information. Tubular makeup system 400 may include a power drive 402, one or more load cells 404 (e.g., similar to torque cell 212), and a remote processing system 406 (e.g., similar to tong remote unit 204 or control system 206) that includes a server 408, and a client 410.

The power drive 402 may be a tong assembly (e.g., similar to tong assembly 100), over drive system, or other makeup tool for connecting casing, tubulars, etc. The load cell 404 may be coupled to the power drive 402 and configured to measure data related to force applied to a connection during makeup. In some cases, the load cells 404 may be wheel force transducers.

The load cell 404 may include interfaces for communicating with another device. For example, the load cell 404 may include a two-wire, 4 . . . 20 mA serial interface 414 used for transmitting force data. The load cell 404 may include an additional interface which may be use for sending the load cell identification information. The load cell 404 may be communicatively coupled with the remote processing system 406 via the interface. One example of the remote processing system 406 includes Joint Analysis and Makeup (JAM) devices, such as the JAMCompact™ torque monitoring system by Weatherford, Inc. The remote processing system 406 may also have an interface that supports serial communication on two channels.

The load cell 404 may send a 4 . . . 20 mA signal representing the measured force over the interface 414 to the remote processing system 406. For example, the 4 . . . 20 mA signal may be sent to the server 408. The force data may be sent (e.g., permanently) during the makeup process to provide information regarding force applied to the threaded connection during the makeup. The server 408 may provide the force data to the client 410. One example of the client 410 includes a JAM client, such as the TorkPro™ torque/turn analyzing software by Weatherford, Inc. The client 410 may calculate torque values based on the force data. The calculated torque values can then be used to evaluate the connection, output a graphical display, make control decisions for power drive 402, etc.

In one aspect, the server 408 may be a stand-alone computer. The server 408 may include a storage unit (e.g., similar to storage device 221) for storing data for operations, such as data for each makeup or break out. Alternatively, the server 408 may be a storage unit in the remote processing system 406. The client 410 may be a terminal computer that may be remote from the server 408, or could be the same computer. The client 410 may be a mobile unit, such as a tablet, that allows operations at flexible locations.

Certain load cells have a variety of available measurement ranges and a variety of calibration settings. For example, some WFT load cells have five available ranges. Conventionally, the range of the force are determined (e.g., looked up) based on datasheets and the values are entered manually into the client 410 by the operator/technician. According to certain aspects of the present disclosure, however, load cell identification information may be determined automatically by the remote processing system 406. For example, the load cell 404 may be configured to send the load cell identification information via a serial interface 412. The interface 412 may be an additional interface on the load cell amplifier, along with a microcontroller. As shown in FIG. 4, the load cell 404 can send the load cell identification information on the serial interface 412 and can send the force data (e.g., torque measurements) on 4 . . . 20 mA interface 414. The load cell identification information may include the load cell identification, type, calibration data, measurement torque range, etc. In aspects, the load cell 404 may send the load cell identification information over the serial interface 412 before makeup of the connection. The remote processing system 406, may read the identification information to ensure that the load cell is valid for this connection. For example, the load cell torque range may be compared to a job defined torque value or range.

Once the remote processing system 406 verifies that the load cell is valid for the connection, the remote processing system 406 may begin the makeup of the connection. During the makeup process, the load cell may send force data via the 4 . . . 20 mA interface 414. The remote processing system 406 may use the torque range information and the force data sent by the load cell 404 to calculate torque values during the makeup process. As shown in FIG. 4, the power drive 402 may also provide number of turns data to the remote processing system 406 (e.g., via a turns counter similar to turns counter 208) which may also be provided to the client 410. The client 410 may use the load cell identification information, force data, and number of turns data to evaluate a connection. In some cases, the client 410 may perform an automated evaluation. In some cases, the client 410 may output a display (e.g., a graphical display) and an operator/technician can evaluate the connection. An input control from the operator/technician or an automated control decision from the client 410 can be sent from the processing system 406 to the power drive 402. In one example, the client 410 may compare the information with job defined set points and create an error message to prevent a wrong set up.

According to certain aspects, parameters provided by the load cell (e.g., the load cell identification information) may include the available measurement ranges and calibration settings, store/restore factory settings for each measurement range, return load cell range, set automatic mode on/off, set tension or compression direction, set individual load cell serial number, storing values for temperature compensation, storing load cell programming date, storing load cell hardware revision, return load cell firmware version, and return load cell part number. Load cell identification information sent by the load cell 404 over the interface may include the load cell (e.g., manufacturer), the load cell serial number, the load cell measurement range, the load cell manufacturing date, the load cell accuracy, and/or calibration information for the load cell (e.g., calibration factors, offset, date of last calibration, next calibration date, name of calibration service, name of inspector, ambient temperature, hardware version and date, software version and date).

According to certain aspects, the load cell 404 includes a load cell amplifier having the serial interface, the 4 . . . 20 mA interface and a microcontroller on board. The identification information data transfer over the two wired interface may be performed in a unidirectional master slave mode. The master software may be located at the remote processing system 406. Read and write operations may be controlled by the server 408. The slave firmware may be implemented in the load cell 404 amplifier.

According to certain aspects, the force data and/or load cell identification information can be sent from server 408 to the client 410 in response to a request. For example, the client 410 may send a request to the server 408 for the force data and/or load cell identification information and server 408 can send the force data and/or the load cell identification information in response to the request.

Figure 5:
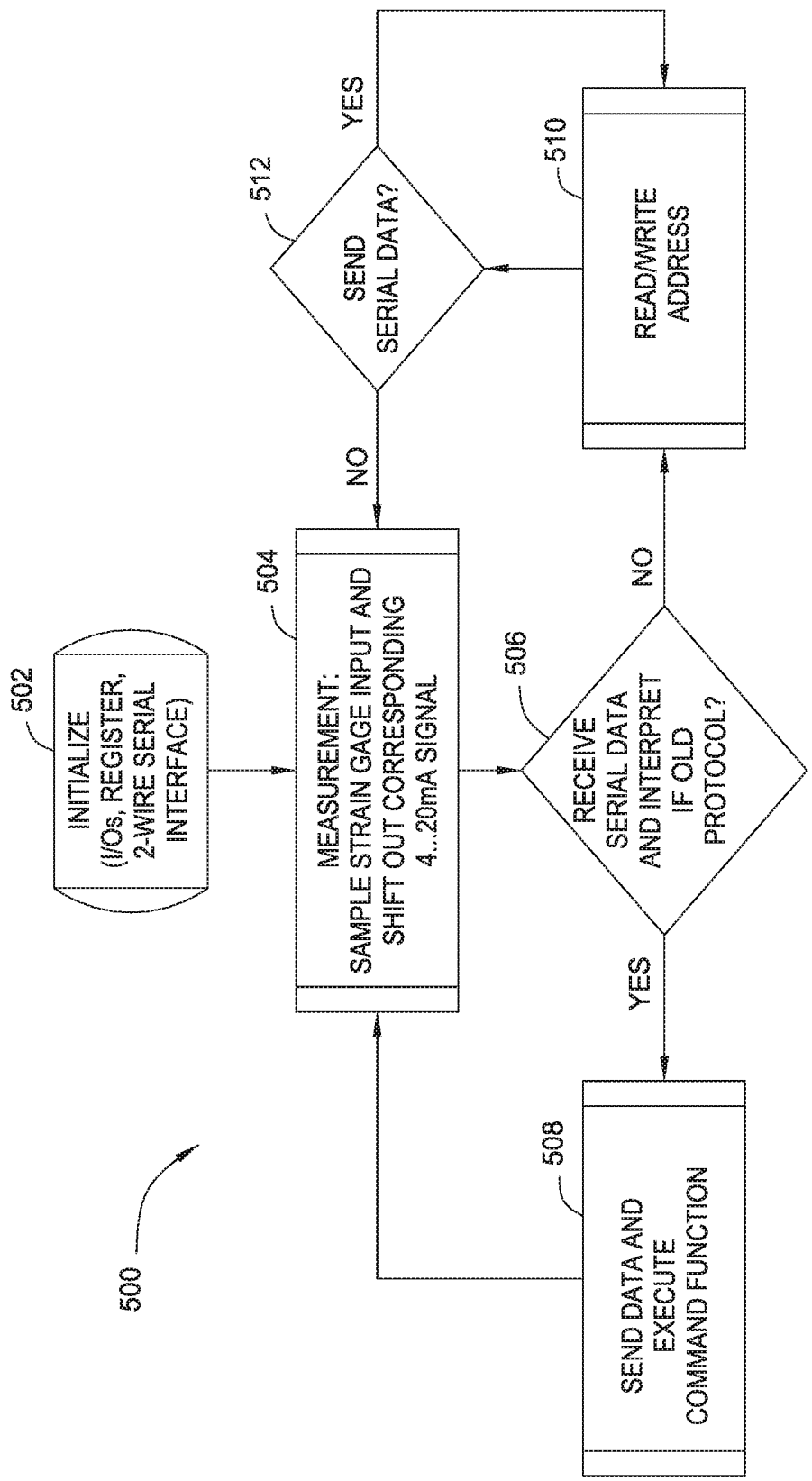
FIG. 5 is a block diagram illustrating example operations of the load cell illustrated in FIG. 4, in accordance with certain aspects of the present disclosure.

According to certain aspects, the load cell 404 may be configured to operate with or without the enhanced features (e.g., without sending the load cell identification information). FIG. 5 is a block diagram illustrating example operations 500 of the (enhanced) load cell 404 illustrated in FIG. 4, in accordance with certain aspects of the present disclosure. As shown in FIG. 5, at 502, the load cell 404 may be initialized (e.g., with I/Os, Register, and the 2-wire serial interface). At 504, the load cell 404 performs force measurements (e.g., using strain gauges) and outputs the corresponding 4 . . . 20 mA signal representing the measurements via the interface. At 506, the load cell 404 can determine whether it is operating under the old protocol or the enhanced protocol. If the load cell 404 is operating under the old protocol, the load cell 404 sends the force data and executes a command function at 508 and then repeats measurements 504. If the load cell 404 is operation under the enhanced protocol, then, at 510, the load cell 404 may receive read/write address command from the remote processing system 406 that requests the data and the load cell identification information and, at 512, the load cell 404 sends the force data and the load cell identification information over the serial interface. For example, the load cell 404 can receive a read request from the processing system 406 (e.g., from the server 408 or the client 410) that indicates an address for the requested load cell identification information.

According to certain aspects, the read request may be sent/received using a customized Modbus protocol. Modbus is a command based serial communication protocol. Following the Modbus protocol, the load cell 404 can receive single characters until an end of transmission is identified. The load cell 404 may translate received commands and execute a program function based on the commands. For example, ten characters (e.g., bytes) can be received via the serial interface in one data block. The ten bytes may include a start byte, a 2 byte address, a function byte, a data length byte, four bytes of data, and a checksum byte (e.g., a longitudinal redundancy check (LRC)). The values of the function byte can indicate a read request, a write request reading ok, writing ok, or an error code. The error codes may indicate an unknown function, unknown address, invalid value, hardware error, checksum error, writing without permission, frame not complete error or sync error (invalid start byte).

Figure 6:
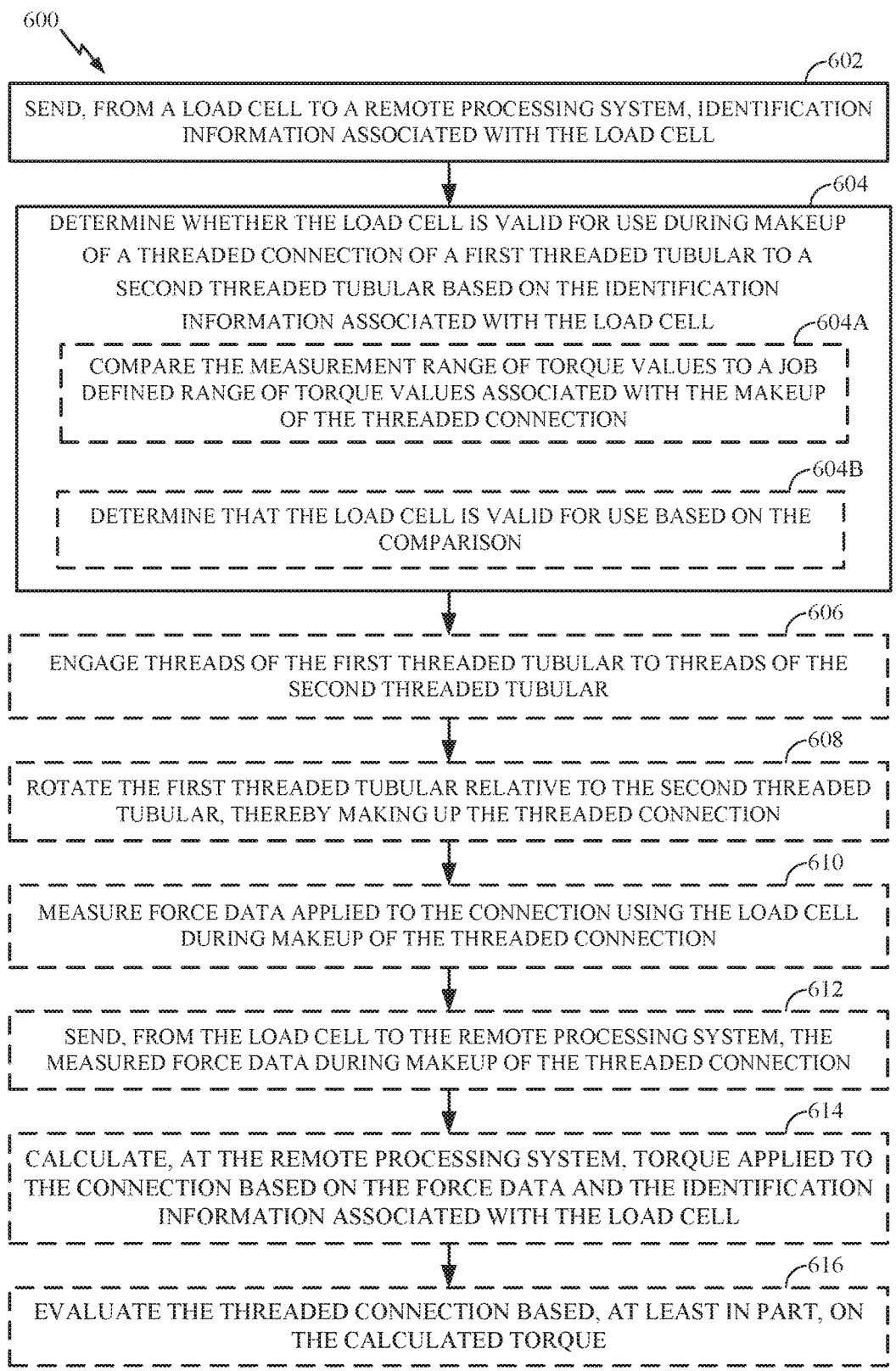
FIG. 6 is a flow diagram illustrating example operations for automated load identification before makeup of a threaded connection, in accordance with certain aspects of the present disclosure.

FIG. 6 is a flow diagram illustrating example operations 600 for connecting a first threaded tubular to a second threaded tubular, in accordance with certain aspects of the present disclosure. The operations 600 may be performed by a tubular makeup system. The operations 600 includes, at 602, sending, from the load cell to a remote processing system, identification information associated with the load cell (e.g., via the serial interface). At 604, the method includes determining whether the load cell is valid for use during makeup of a threaded connection of a first threaded tubular to a second threaded tubular based on the identification information associated with the load cell. As shown in FIG. 6, the determination may include, at 604A, comparing the measurement range of torque values to a job defined range of torque values associated with the makeup of the threaded connection and, at 604B, determining that the load cell is valid for use based on the comparison. After determining the load cell is valid, the tubular makeup process may be performed, for example, as shown in steps 606-616. At 606, the threads of the first threaded tubular may be engaged to threads of the second threaded tubular. At 608, the first threaded tubular is rotated relative to the second threaded tubular, thereby making up the threaded connection. At 610, during makeup of the threaded connection force data applied to the threaded connection is measured using the load cell (e.g., a wheel force transducer load cell). At 612, during the makeup of the threaded connection, the measured force data is sent from the load cell (e.g., via the 4 . . . 20 mA interface) to the remote processing system. At 614, torque applied to the connection is calculated, at the remote processing system, based on the force data and the identification information (e.g., based on the measurement torque range information). At 616, the threaded connection is evaluated based, at least in part, on the calculated torque.

According to certain aspects, different techniques can be used for automated load cell identification. For example, the load cell identification information can be sent via the coded 4 . . . 20 mA signal on power up. As another example, a barcode or radio frequency identification (RFID) can be used to obtain the load cell identification information. For example, the load cells can be tagged with the barcode or RFID tag and a scanner may be used to scan the barcode or RFID tag. In yet another example, a beacon can be transmitted, for example using Bluetooth technology that includes some load identification information. In yet another example, a Highway Addressable Remote Transducer (HART) protocol can be used by adding a frequency modulated data signal to the 4 . . . 20 mA signal to send load cell identification information. In yet another example, the IEEE 1451.4 Standard for Smart Transducers can be used for a "plug and play" approach to sending the load cell identification information.

While the foregoing is directed to embodiments of the present disclosure, other and further embodiments of the disclosure may be devised without departing from the basic scope thereof, and the scope of the invention is determined by the claims that follow.

The invention claimed is:

1. A method of automated load cell identification comprising: sending, from a load cell to a remote processing system, identification information associated with the load cell, the identification information including a measurement range of torque values supported by the load cell; and using the identification information associated with the load cell during makeup of a threaded connection of a first threaded tubular to a second threaded tubular.

2. The method of claim 1, wherein
using the identification information associated with the load cell during the makeup of the threaded connection comprises:
comparing the measurement range of torque values to a job-defined range of torque values associated with the makeup of the threaded connection; and determining that the load cell is valid for use based on the comparison.

3. The method of claim 1, wherein:
the makeup of the threaded connection includes:
engaging threads of the first threaded tubular to threads of the second threaded tubular; and
rotating the first threaded tubular relative to the second threaded tubular, thereby making up the threaded connection; and
using the identification information associated with the load cell during the makeup of the threaded connection comprises:
measuring force data applied to the threaded connection using the load cell; and
sending, from the load cell to the remote processing system, the measured force data;
calculating, at the remote processing system, torque applied to the threaded connection based on the force data and the identification information associated with the load cell; and
evaluating the threaded connection based, at least in part, on the calculated torque.

4. The method of claim 3, wherein:
sending the measured force data comprises sending the measured force data via a first interface between the load cell and the remote processing system; and
sending the identification information comprises sending the identification information via a second interface between the load cell and the remote processing system.

5. The method of claim 4, wherein:
the first interface comprises a 4 . . . 20 mA interface; and
the second interface comprises a serial interface.

6. The method of claim 3, further comprising:
sending the force data and the identification information to a client of the remote processing system, wherein the evaluating is performed by the client.

7. The method of claim 1, further comprising:
receiving, at the load cell, a request from the remote processing system for the identification information, wherein the identification information is sent in response to the request.

8. The method of claim 1, wherein the identification information further comprises at least one of: an identification of the load cell, a type of the load cell, a force measurement range of the load cell, a measurement accuracy of the load cell, a manufacturing date of the load cell, a serial number of the load cell, or calibration information associated with the load cell.

9. A load cell comprising:
a transducer configured to measure force data;
a first interface configured to send identification information associated with the load cell to a remote processing system; and
a second interface configured to send the measured force data to the remote processing system;
wherein the identification information comprises at least one of: an identification of the load cell, a type of the load cell, a force measurement range of the load cell, a measurement accuracy of the load cell, a manufacturing date of the load cell, a serial number of the load cell, or calibration information associated with the load cell.

10. The load cell of claim 9, wherein the identification information includes a measurement range of torque values supported by the load cell.

11. The load cell of claim 9, wherein:
the first interface comprises a 4 . . . 20 mA interface; and
the second interface comprises a serial interface.

12. The load cell of claim 9, wherein the first interface is configured to:
receive a request from the remote processing system for the identification information; and
send the identification information in response to the request.

13. A tubular makeup system comprising:
a load cell; and
a remote processing system in communication with the load cell, wherein:
the load cell is configured to send identification information associated with the load cell to the remote processing system, the identification information including a measurement range of torque values supported by the load cell; and
the remote processing system is configured to use the identification information associated with the load cell during makeup of a threaded connection of a first threaded tubular to a second threaded tubular.

14. The tubular makeup system of claim 13, wherein the remote processing system is configured to:
compare the measurement range of torque values to a job-defined range of torque values associated with the makeup of the threaded connection; and
determine that the load cell is valid for use based on the comparison.

15. The tubular makeup system of claim 13, further comprising:
a power drive operable to rotate the first threaded tubular relative to the second threaded tubular thereby making up the threaded connection, wherein:
the load cell is configured to, during the makeup of the threaded connection:
measure force data applied to the threaded connection; and
send, to the remote processing system, the measured force data; and
the remote processing system is further configured to:
calculate torque applied to the threaded connection based on the measured force data and the identification information associated with the load cell; and
evaluate the threaded connection based, at least in part, on the calculated torque.

16. The tubular makeup system of claim 15, further comprising:
a first interface and a second interface between the load cell and the remote processing system, wherein the load cell is configured to:
send the measured force data via the first interface; and
send the identification information via the second interface.

17. The tubular makeup system of claim 16, wherein:
the first interface comprises a 4 . . . 20 mA interface; and
the second interface comprises a serial interface.

18. The tubular makeup system of claim 13, wherein the load cell is further configured to:
receive a request from the remote processing system for the identification information; and
send the identification information in response to the request.

19. The tubular makeup system of claim 13, wherein the identification information further comprises at least one of: an identification of the load cell, a type of the load cell, a force measurement range of the load cell, a measurement accuracy of the load cell, a manufacturing date of the load cell, a serial number of the load cell, or calibration information associated with the load cell.

* * * * *